No. 652,173. Patented June 19, 1900.
A. C. EINSTEIN.
ACETYLENE GAS GENERATING LAMP.
(Application filed Aug. 21, 1899.)
(No Model.)
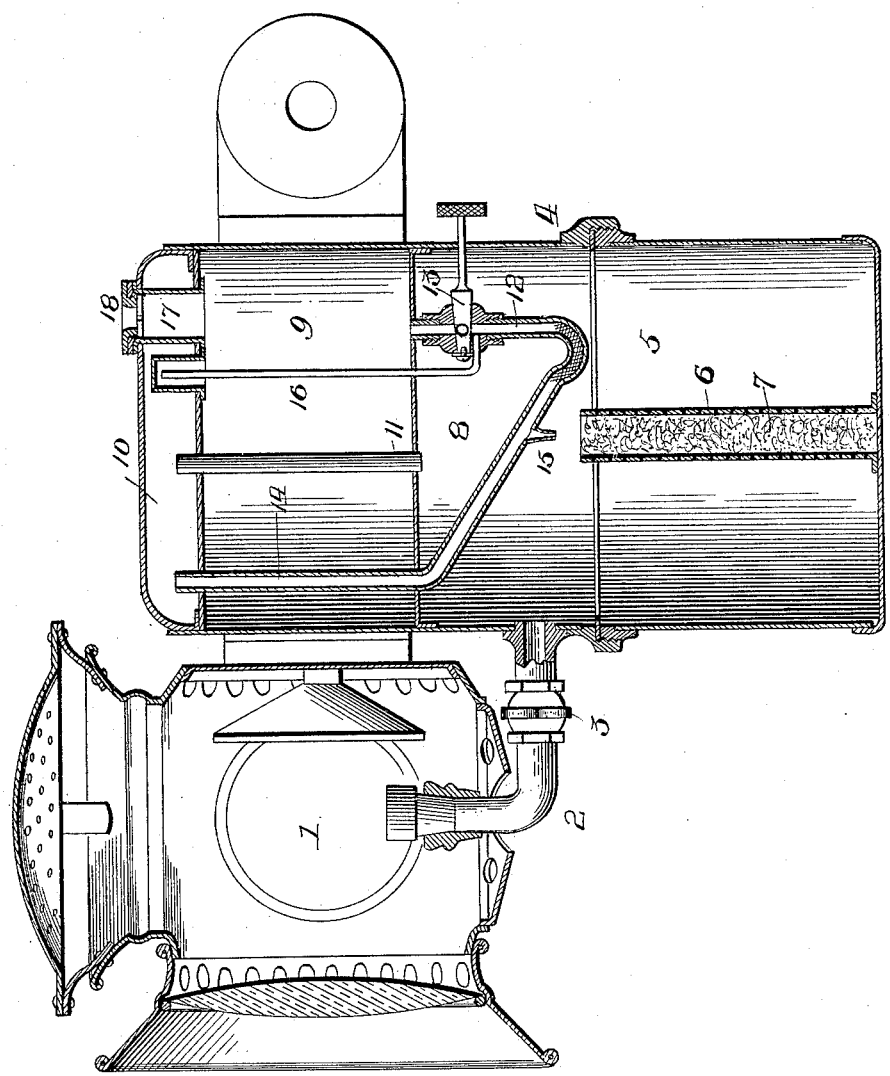

UNITED STATES PATENT OFFICE.

ALFRED C. EINSTEIN, OF ST. LOUIS, MISSOURI.

ACETYLENE-GAS-GENERATING LAMP.

SPECIFICATION forming part of Letters Patent No. 652,173, dated June 19, 1900.

Application filed August 21, 1899. Serial No. 727,986. (No model.)

*To all whom it may concern:*

Be it known that I, ALFRED C. EINSTEIN, a citizen of the United States, and a resident of St. Louis, in the State of Missouri, have invented certain new and useful Improvements in Acetylene-Lamps, of which the following is a specification.

My invention relates more particularly to improvements in acetylene-gas generators for use in connection with bicycle or other portable lamps, but is not restricted to such use.

One feature of my present invention consists in combining with a suitable container and a gas-chamber and reservoir above the container a downwardly-extending liquid-feed having an uptake extension of approximately-uniform section communicating with the gas-chamber at a point above the liquid-reservoir and a restricted liquid-outlet located in the uptake of the liquid-feed in suitable relation to the container, so that the liquid must rise slightly before escaping from the feed, and the gas-pressure communicated to the liquid-feed will be ample to control the entire flow of liquid and will be exerted in a direction downward from the escape-opening, so as to prevent possibility of escape of any liquid in opposition to the pressure of the gas.

Another feature consists in locating in the lower portion of the liquid-feed a gauze or absorbent filling which will restrict the volume of water contained therein and prevent possibility of jarring out small quantities of water in opposition to the gas-pressure.

A further feature consists in utilizing the liquid-feed as a safety escape-vent, and in providing therein below the cut-off cock a vent which will permit escape of excessive pressure in the event that too much gas is generated when said cock is closed.

A further feature consists in providing a gas-chamber above the liquid-reservoir, together with a pipe leading from the reservoir and terminating the uptake or gas-pressure tube of the liquid-feed in said chamber above the reservoir.

My invention will be fully understood upon reference to the accompanying drawing, which represents in vertical section a bicycle-lamp having the features of my invention applied thereto.

1 represents the lamp, having a burner-tube 2, provided with a key or cut-off 3. The tube 2 communicates with the gas-chamber of the generator 4 in any suitable manner. The generator comprises a lower carbid receptacle or container 5, provided with a central perforated tube 6, which is filled with absorbent material 7, a gas-chamber 8 above the container 5, a liquid-reservoir 9 above the gas-chamber, and a chamber 10 above the liquid-reservoir, which communicates with the main gas-chamber 8 through a tube 11. The reservoir 9 has a downwardly-extending liquid-feed 12, preferably provided with a cock 13 and formed with an uptake extension 14 of substantially-uniform diameter, which extends through the reservoir 9 and terminates in the top chamber 10, so as to subject liquid in the feed-pipe 12 to pressure of gas in the chamber 8. Located in the uptake 14 at a point in suitable relation to the tube 6 is a restricted liquid-outlet 15, which discharges into said tube 6. The effect of this arrangement is to bring the feed of liquid absolutely under control of pressure of gas in the gas-chamber. The pressure being exerted upon the flow of liquid downward at the point of discharge, full efficiency of pressure is imposed and the escape of liquid, except at times when the generation of gas is required, is absolutely prevented by reason of the enlarged area of the gas-pressure in the pipe and the comparatively-restricted area of the outlet 15. To prevent escape of liquid as a result of jarring the lamp, the dip or lowest point in the tube 12 is filled with gauze or absorbent material, so as to prevent a sufficient body of liquid standing adjacent to the outlet to overcome the gas-pressure in the event of jarring.

In the ordinary action of the lamp when the liquid-feed is open any excess in the production of gas would escape past the cock 13 in the event that the key 3 is turned off. In order to prevent development of excess pressure, however, in the event that both the key 3 and cock 13 are turned off, I provide a vent 16, communicating between a point in the liquid-feed below the cock 13 and a point in the liquid-reservoir above the liquid-level. By this means any excess of gas may escape into the liquid-reservoir and out through the charging-opening 17, the cap 18 being perforated, as shown.

It will be seen that the feed-tube 12 is vertically beneath the charging-opening 17. This is advantageous in that it permits the insertion of an instrument into the tube 12 to clear the latter of obstructions or to remove the gauze or absorbent material therein in the event that the latter is to be replaced.

Carbid is placed in the container 5 in any suitable form. The cock 13 being turned on, water will make its way down through the tube 12, past the filling in the dip of said tube and up to the restricted discharge-opening 15, and thence into the perforated tube 6, where it is taken up by the absorbent material and gradually transmitted as it is needed to the carbid in the container 5. As soon as a suitable pressure of gas is developed in the chamber 8 the water-supply is restricted or wholly cut off by the communication of said pressure down through the uptake 14, which, by reason of the upward flow of the water to the point of escape and the restricted dimension of the outlet, will accurately control the supply of liquid to the carbid and make the lamp absolutely automatic in its operation. Not only does the filling of gauze in the dip of the pipe 12 prevent the jarring out of additional quantities of water after the water-feed has been cut off by the development of gas-pressure, but it also serves the function of preventing displacement of the water in the tube 12 sufficient to permit escape of gas to result from jarring. A further effect of this arrangement is that the gas-pressure forces the liquid downward and away from the outlet, so that said outlet is then above the liquid and spilling out cannot take place. I am therefore enabled to produce a generating-lamp in which no appreciable flicker or irregularity in the flame and no overproduction of gas or waste can result from rough handling or jarring.

The most material and governing feature of my improved lamp lies in the construction of the downwardly-extending liquid-feed tube having an uptake provided with a restricted outlet, said uptake being open to communication with the gas-space within the lamp, so that the gas may enter the uptake portion of said tube and act against the liquid therein to force it through said restricted outlet against the pressure of gas around the outlet and in the existence of a surplusage of gas to force the liquid backwardly through the liquid-feed tube to the liquid-reservoir. By this means an even pressure of gas produced within the lamp is maintained, for the reason that the gas produced constantly acts to balance and equalize the flow of liquid into the carbid, so that liquid is discharged thereto only at such time as the gas-pressure remains approximately normal. In the practical working of the lamp in starting operation the liquid flows from the reservoir 9 through the feed-tube 12 and reaching the restricted outlet 15 discharges therefrom onto the carbid. As soon as the gas produced from the discharge of water onto the carbid has reached a normal pressure within the gas-chamber such pressure acts against the free discharge of liquid through the restricted outlet, and were the continuation of the liquid-feed tube closed instead of open at its end the pressure of gas against said outlet would act to stop the flow of liquid therefrom. With the continuation or uptake portion of the liquid-feed tube open at its end the gas gains access thereto and passing therethrough exerts its pressure against the liquid within the tube, thereby equalizing the exterior pressure of gas against the restricted outlet. It is therefore obvious that there is thus produced an equalization and balance of pressure both exterior and interior of the uptake to act against the liquid therein, so that the discharge of liquid through the restricted outlet is maintained uniform. It is a matter of knowledge that in the operation of the lamp the gas-pressure exerted in the manner stated within the exterior of the liquid-feed tube causes a constant pulsation of the liquid between the restricted outlet and the open upper end of the feed-tube, so that the drops of water discharged through the restricted outlet are constant and uniform throughout the period that the lamp is in use. In the event of the discharge of an excess of water through the restricted outlet onto the carbid an excess of gas is produced, with the result that an excess of pressure occurs in the uptake of the liquid-feed tube and pressing against the liquid therein forces it backwardly past the restricted outlet, thereby completely cutting off the discharge of liquid until such time as the pressure of gas returns to the normal, when the excessive pressure within the feed-tube is lowered and the liquid is permitted to return to the restricted outlet to be forced therethrough in the same manner as before.

Having thus described my invention, the following is what I claim as new therein and desire to secure by Letters Patent:

1. In a gas-generator, the combination of the carbid-container, a gas-chamber, a liquid-reservoir, a liquid-feed tube leading from said reservoir and having an uptake open to communication with said gas-chamber, said uptake being provided with a restricted outlet for the escape of liquid to said carbid-container, substantially as described.

2. In a gas-generator, the combination of a carbid-container, the gas-chamber, a liquid-reservoir, a liquid-feed tube leading downwardly from said liquid-reservoir and provided with a dip, said feed-tube having an uptake open to communication with the gas-chamber, and said uptake being provided with a restricted outlet, substantially as set forth.

3. In a gas-generator, the combination of a suitable carbid-container, a main gas-chamber above said container, a liquid-reservoir above the gas-chamber, an additional gas-chamber above the liquid-reservoir, having communication with the main gas-chamber, and a liquid-feed comprising a tube extending downwardly from the liquid-reservoir, thence upwardly through the liquid-reservoir into the gas-chamber above the same, and a discharge-outlet located in said liquid-supply pipe above the lowest point thereof; substantially as set forth.

4. In combination with a gas-generator, having a suitable carbid-container and a liquid-reservoir wholly above the same, the downwardly-extending liquid-supply-feed tube, said tube being provided with a dip therein and with an uptake communicating with the gas-chamber at a point above the liquid-reservoir, said uptake being provided with a restricted liquid-outlet in said uptake above the dip in the supply-tube, and a filling of gauze or the like in said dip, substantially as explained.

ALFRED C. EINSTEIN.

Witnesses:
H. S. KNIGHT,
WALTER ALLEN.